United States Patent [19]

Katavolos

[11] Patent Number: 4,932,558
[45] Date of Patent: Jun. 12, 1990

[54] FLUID CONTAINER AND METHOD OF FORMING SAME FROM A COMPRESSED BODY

[76] Inventor: William Katavolos, 300 E. 51st St., New York, N.Y. 10022

[21] Appl. No.: 348,995

[22] Filed: May 8, 1989

[51] Int. Cl.⁵ .............................................. B65D 25/24
[52] U.S. Cl. ..................................... 220/5 R; 220/5 A
[58] Field of Search ............ 220/5 R, 5 A, 410, 1 B, 220/4 F, 85 B, 85 A

[56] References Cited

U.S. PATENT DOCUMENTS

| | | | |
|---|---|---|---|
| 3,291,437 | 12/1966 | Bowdge et al. | 220/5 R |
| 3,819,079 | 6/1974 | Levens | 220/5 A |
| 3,990,600 | 11/1976 | Rossitto et al. | 220/5 A |
| 4,036,390 | 7/1977 | Morse | 220/5 A |
| 4,068,777 | 1/1978 | Humphrey et al. | 220/5 A |
| 4,077,158 | 3/1978 | England . | |
| 4,079,726 | 3/1978 | Voelker . | |
| 4,181,235 | 1/1980 | Baysinger | 220/5 A |
| 4,280,477 | 7/1981 | Divine . | |
| 4,470,405 | 9/1984 | Landstrom . | |

*Primary Examiner*—Joseph Man-Fu Moy
*Attorney, Agent, or Firm*—Frishauf, Holtz, Goodman & Woodward

[57] ABSTRACT

A swimming pool is constructed from a compressed body of the type formed from an open cup-shaped flexible membrane having a bottom and a side wall connected to the bottom; an upper portion of the side wall of the cup-shaped flexible membrane folded externally over a lower portion of the side wall to define an outer chamber between the upper and lower portions of the side wall, the outer chamber being open adjacent the bottom of the cup-shaped flexible membrane; a plurality of substantially rigid supports inserted in the outer chamber; and the folded side wall being compressed toward a center of the cup-shaped flexible membrane. First, a base having a bottom wall and a shallow retaining wall extending around the periphery of the bottom wall and in liquid sealing contact therewith, is positioned on a flat surface. A liquid is then supplied to the base and the compressed body is positioned on the base within the shallow retaining wall such that the outer chamber opens into the liquid. Finally, the cup-shaped flexible membrane is filled with a fluid, to cause the folded side wall of the flexible membrane to be expanded outwardly until restrained by the shallow retaining wall of the base and to cause the liquid to at least substantially fill the outer chamber to provide additional rigidity to the expanded side wall.

30 Claims, 7 Drawing Sheets

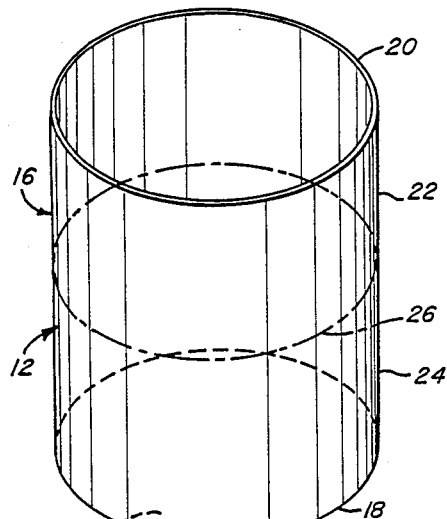
Fig.1
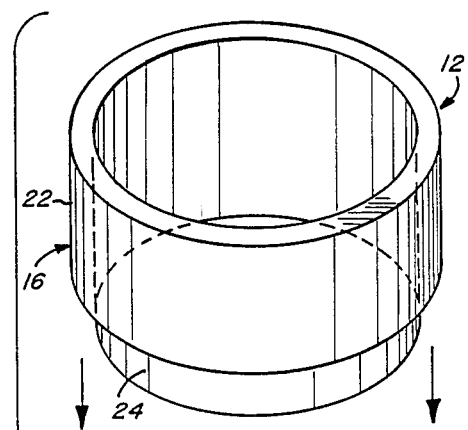
Fig.2
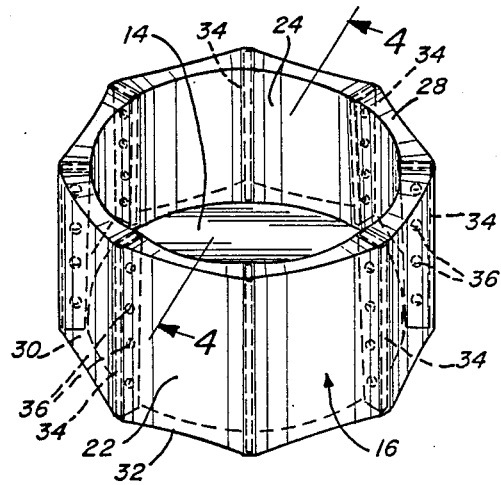
Fig.3
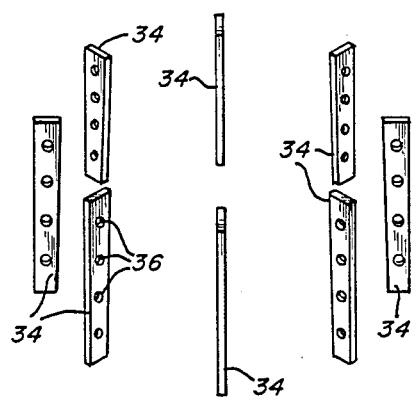
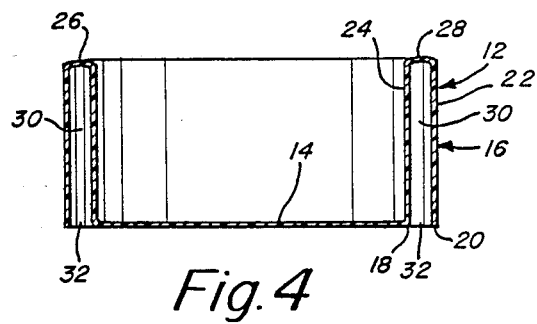
Fig.4
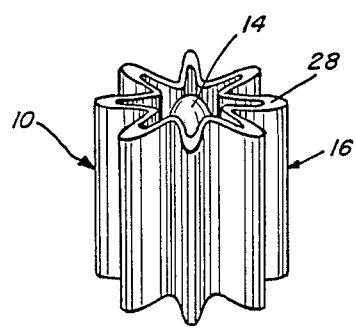
Fig.5

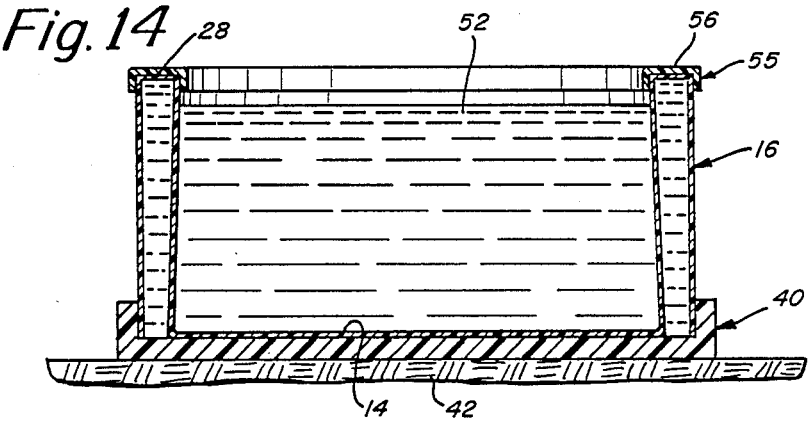
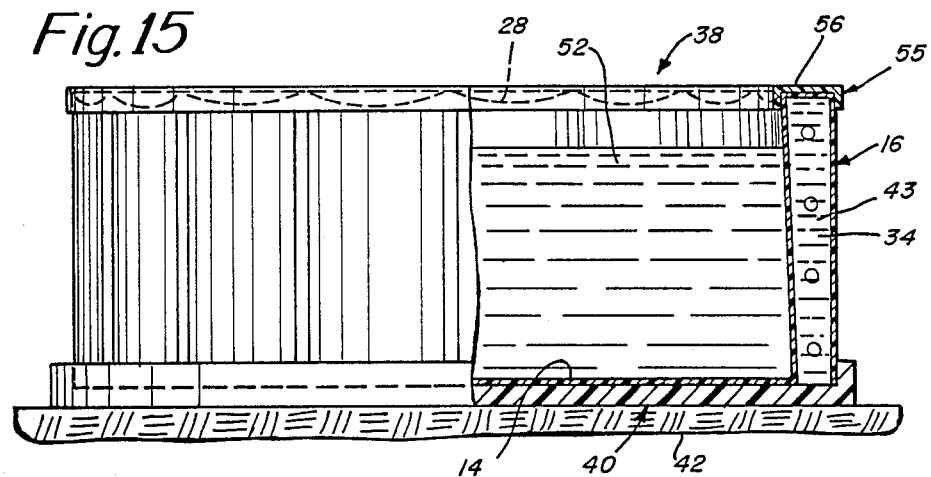
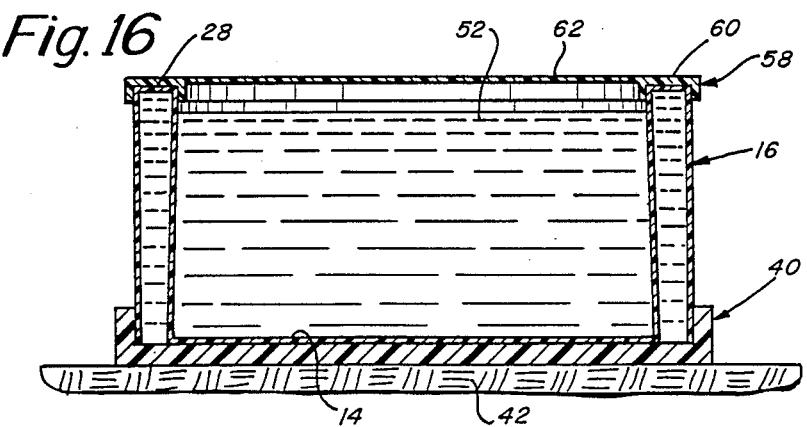

FLUID CONTAINER AND METHOD OF FORMING SAME FROM A COMPRESSED BODY

BACKGROUND OF THE INVENTION

This invention relates generally to fluid containers, and more particularly, is directed to a fluid container that can be formed from a compressed body that is expanded by supplying a fluid thereto.

Generally, when forming above-ground swimming pools, a circular area in the ground is dug out slightly. Then, vertical support posts are inserted in the ground around the periphery of the dug-out circle, and a metal side wall frame is placed within the circumference defined by the posts and secured thereto. A liner is then unfolded and secured within the metal frame to define the pool, and a rim is placed on the upper ends of the posts to stabilize the pool. However, such operation is extremely complex and burdensome. In addition, because of the materials used, the pool components are not very compact.

OBJECTS OF THE INVENTION

Accordingly, it is an object of the present invention to provide a fluid container that can be easily and readily constructed with a minimum of effort.

It is another object of the present invention to provide a fluid container which can be stored and packaged as a compressed body in a compact manner.

It is still another object of the present invention to provide a fluid container which can be expanded from its compact form merely by the addition of a fluid thereto.

It is yet another object of the present invention to provide a fluid container which can be used to hold gases and/or liquids.

It is a further object of the present invention to provide a fluid container which can be used as a swimming pool.

The above and other objects, features and advantages of the present invention will become readily apparent from the following detailed description which is to be read in connection with the accompanying drawings.

SUMMARY OF THE INVENTION

In accordance with an aspect of the present invention, a compressed body that is usable as a fluid container when expanded, includes an open cup-shaped flexible membrane having a bottom and a side wall connected to the bottom; an upper portion of the side wall of the cup-shaped flexible membrane folded externally over a lower portion of the side wall; an outer chamber defined between the upper and lower portions of the side wall, the outer chamber being open adjacent the bottom of the cup-shaped flexible membrane; a plurality of substantially rigid supports inserted in the outer chamber; and the folded side wall being compressed toward a center of the cup-shaped flexible membrane.

In accordance with another aspect of the present invention, a method of constructing a compressed body that is usable as a fluid container when expanded, includes the steps of forming a flexible membrane into a cup shape with a bottom, a side wall connected to the bottom and the side wall being open at an upper portion thereof; folding the upper portion of the side wall of the cup-shaped flexible membrane externally over a lower portion of the side wall so as to define an outer chamber between the upper and lower portions of the side wall, the outer chamber being open adjacent the bottom of the cup-shaped flexible membrane; inserting a plurality of substantially rigid supports in the outer chamber; and compressing the folded side wall toward a center of the cup-shaped flexible membrane to form the compressed body.

In accordance with still another aspect of the present invention, a fluid container includes a base having a bottom wall and a shallow restraining wall extending around the periphery of the bottom wall and in liquid sealing contact therewith; and an open cup-shaped flexible membrane positioned on the bottom wall and within the shallow retaining wall, the flexible membrane including a bottom, a side wall connected to the bottom, an upper portion of the side wall folded externally over a lower portion of the side wall, an outer chamber defined between the upper and lower portions of the side wall, the outer chamber being open adjacent the bottom of the cup-shaped flexible membrane, a plurality of substantially rigid supports inserted in the outer chamber, the folded side wall of the flexible membrane being expanded outwardly by a fluid supplied thereto so that the folded side wall is restrained by the shallow restraining wall of the base and so that a liquid on the base at least substantially fills the outer chamber to provide additional rigidity to the expanded side wall.

In accordance with yet another aspect of the present invention, a method of constructing a fluid container from a compressed body of the type formed from an open cup-shaped flexible membrane having a bottom and a side wall connected to the bottom; an upper portion of the side wall of the cup-shaped flexible membrane folded externally over a lower portion of the side wall to define an outer chamber between the upper and lower portions of the side wall, the outer chamber being open adjacent the bottom of the cup-shaped flexible membrane; a plurality of substantially rigid supports inserted in the outer chamber; and the folded side wall being compressed toward a center of the cup-shaped flexible membrane, includes the steps of positioning a base having a bottom wall and a shallow restraining wall extending around the periphery of the bottom wall and in liquid sealing contact therewith, on a surface; supplying a liquid to the base; positioning the compressed body on the base within the shallow retaining wall such that the outer chamber opens into the liquid; and filling the cup-shaped flexible membrane with a material, such as a fluid, to cause the folded side wall of the flexible membrane to be expanded outwardly until restrained by the shallow restraining wall of the base and to cause the liquid to at least substantially fill the outer chamber to provide additional rigidity to the expanded side wall.

BRIEF DESCRIPTION OF THE DRAWINGS

FIG. 1 is a perspective view of a cup-shaped flexible membrane used to form a compressed body which forms the fluid container according to the present invention when expanded;

FIG. 2 is a perspective view of the flexible membrane of FIG. 1, with the upper half of the side wall folded externally over the lower half of the side wall, and the support posts disassembled and blown apart therefrom;

FIG. 3 is a perspective view of the folded flexible membrane of FIG. 2, assembled with the support posts;

FIG. 4 is a cross-sectional view of the assembly of FIG. 3, taken along line 4—4 thereof;

FIG. 5 is a perspective view of the compressed body according to the present invention, formed from the assembly of FIG. 3, and used to form the fluid container according to the present invention;

FIG. 14 is a cross-sectional view of the base of FIG. 9, with the compressed body entirely expanded and with an upper rim thereon;

FIG. 15 is a part side elevational view, partially broken away of a swimming pool formed according to the present invention, with an upper rim thereon;

FIG. 16 is a cross-sectional view of the base of FIG. 9, with the compressed body entirely expanded and with a cover thereon;

DETAILED DESCRIPTION

Figure 6:
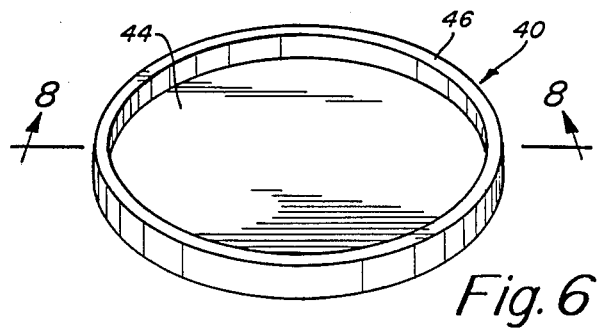
FIG. 6 is a perspective view of a unitary formed base according to the present invention.

Referring to the drawings in detail, and initially to FIGS. 1-5, a compressed body 10 (FIG. 5) for forming a fluid container according to the present invention, will first be described. Specifically, as first shown in FIG. 1, a flexible membrane 12 is formed in a bag-like or cup-like shape with a circular bottom 14 and a cylindrical side wall 16 secured at its lower edge 18, in a fluid sealing manner, to bottom 14. In this regard, the upper edge 20 of flexible membrane 12 is open. Flexible membrane 12 can be made of any suitable material, such as a durable plastic material. Preferably, flexible membrane 12 is transparent (or at least translucent) and at least liquid impervious, the reasons for which will be made apparent hereinafter. Flexible membrane 12 can also be fluid impervious. In this regard, the term fluid as used throughout this application is intended to encompass both liquids and gases.

As shown in FIG. 2, the upper half 22 of side wall 16 is then folded externally over the lower half 24 of side wall 16 along an imaginary circumferential fold line 26 (FIG. 1). In such case, imaginary fold line 26 constitutes the upper edge 28 (FIGS. 3 and 4) of the folded side wall 16. When upper half 22 is folded over lower half 24, a circumferential outer chamber 30 is defined between upper and lower halves 22 and 24 of folded side wall 16, outer chamber 30 being open at 32 (FIG. 4), adjacent the bottom 14 of flexible membrane 12.

A plurality of substantially rigid support posts 34 are inserted in outer chamber 30 to provide support for folded side wall 16. Such support posts 34 preferably are thin boards, having a substantially elongated rectangular configuration. Support posts 34 can be made from any suitable substantially rigid material, such as acrylics or the like. Support posts 34 are preferably arranged equidistantly from each other in outer chamber 30.

In addition, support posts 34 preferably have a plurality of apertures 36 therein. In this manner, when outer chamber 30 is filled with a liquid, as will be apparent from the disclosure hereinafter, the liquid can travel through posts 34 to equally distribute itself in outer chamber 30.

After flexible membrane 12 and support posts 34 have been so formed and assembled, as shown in FIG. 3, folded side wall 16 is compressed inwardly toward the center of flexible membrane 12, as shown in FIG. 5, to form compressed body 10 in the general form of a cylindrical spur gear.

In such state, compressed body 10 is compact and thereby easy to package and transport. Compressed body 10 is also lightweight and easy to manage.

Figure 7:
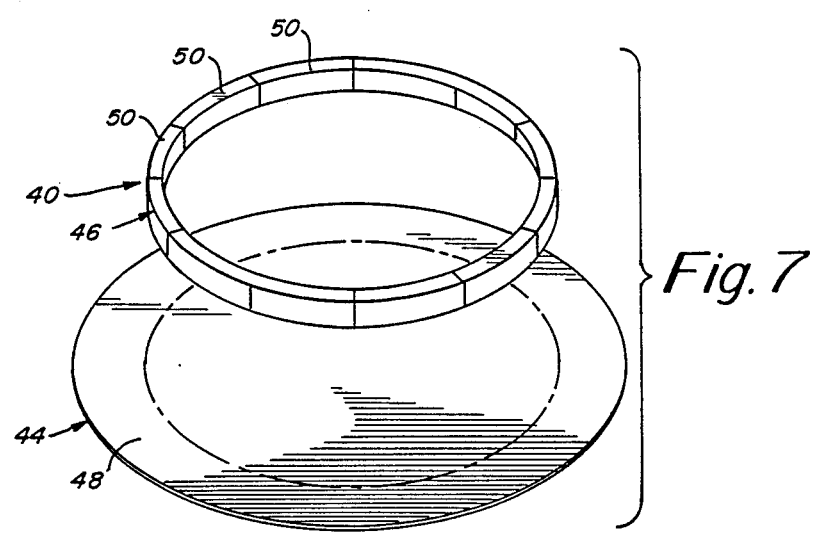
FIG. 7 is a perspective, exploded view of a sectionally formed base according to the present invention.
Figure 8:
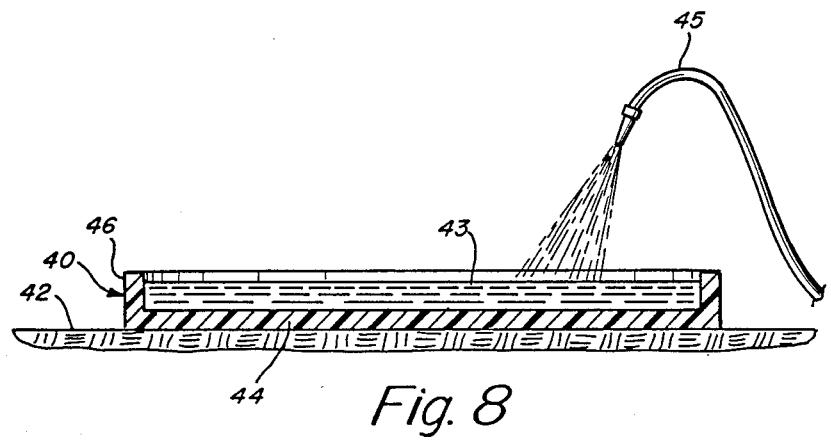
FIG. 8 is a cross-sectional view of the base of FIG. 6, taken along line 8—8 thereof, positioned on level ground and filled with water.

The following discussion will relate specifically to forming compressed body 10 into a sufficiently rigid, self-supporting fluid container 38 that is used as a swimming pool. Specifically, a base 40 (FIG. 6 or 7) is positioned on level ground 42 and filled with a liquid, such as water 43 from a hose 5, as shown in FIG. 8. Base 40 includes a bottom wall 44 and a shallow retaining wall 46 extending around the periphery of bottom wall 44 and in liquid sealing contact therewith, as shown in FIGS. 6 and 7. Thus, when base 40 is filled with water, the water will be retained within base 40.

Bottom wall 44 may be formed as a unitary piece (FIGS. 6 and 8), or may be formed sectionally (FIG. 7). In the latter regard, bottom wall 44 can be formed as a bottom liner 48 and retaining wall 46 can be formed as a hoop from a plurality of arcuate sections 50 which are assembled together and then connected with bottom liner 48. Arcuate sections 50, for example, can be connected in a fluid sealing manner by means of a tongue and groove connection with a suitable elastic seal thereat, as is well known in the art. Bottom liner 48 and retaining wall 46, in such case, can be fluidly sealed by any suitable means, for example, by an adhesive which secures bottom liner 48 to retaining wall 46. As such, base 40 can be transported and packaged in a compact manner, and then be assembled for later use.

Figure 9:
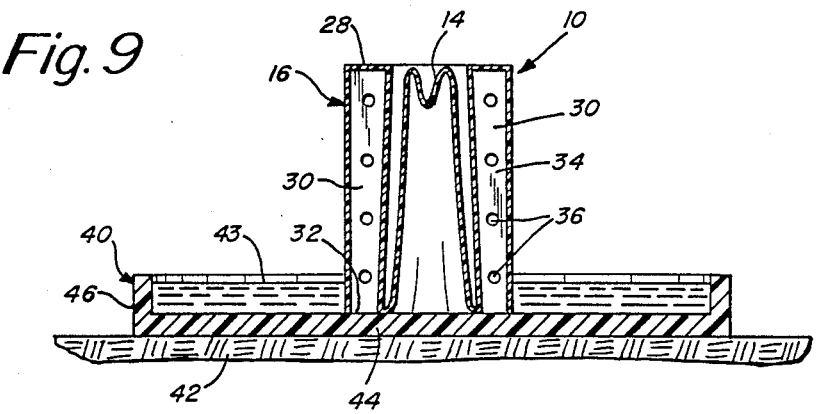
FIG. 9 is a cross-sectional view of the base of FIG. 8, with the compressed body positioned thereon.

After base 40 has been filled with water 43, compressed body 10 is positioned substantially centrally on bottom wall 44 of base 40, as shown in FIG. 9. It will be remembered that folded side wall 16 of compressed body 10 had previously been compressed inwardly, as shown in FIG. 5. Accordingly, air within outer chamber 30 had been expelled therefrom. When compressed body 10 is positioned in water 43 on bottom wall 44, the open end 32 of outer chamber 30 is thereby sealed. Accordingly, if folded side wall 16 of compressed body 10 is expanded outwardly, outer chamber 30 also expands. Because there is substantially no air in outer chamber 30, as it expands, a vacuum is created which sucks up water 43 on base 40 to fill the void.

Figure 10:
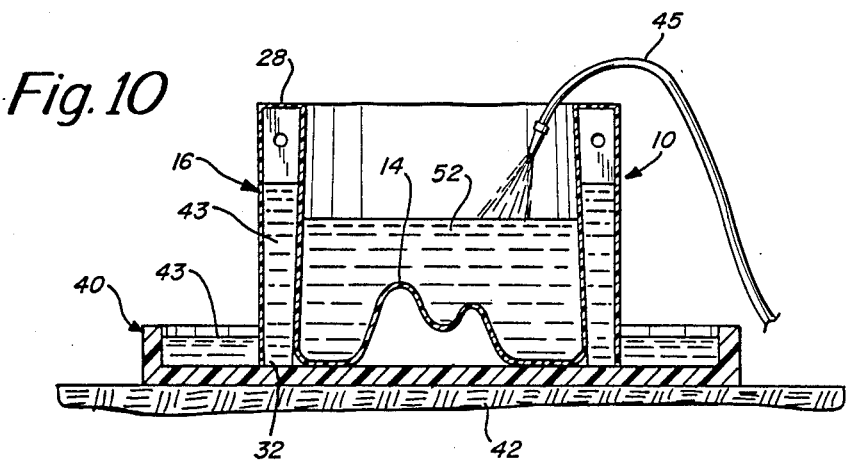
FIG. 10 is a cross-sectional view of the base of FIG. 9, with the compressed body partially expanded.
Figure 11:
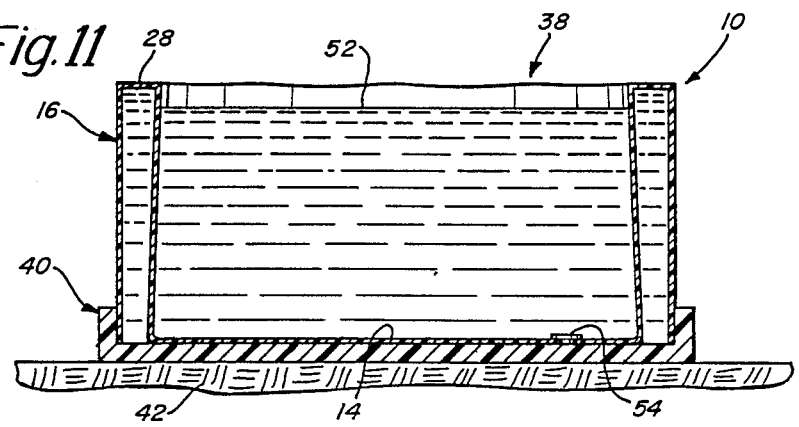
FIG. 11 is a cross-sectional view of the base of FIG. 9, with the compressed body entirely expanded.

Specifically, hose 45 fills the interior of compressed body 10 with a liquid, such as water 52. This causes folded side wall 16 to expand and move outwardly, as shown in FIG. 10. During such movement, the vacuum created in outer chamber 30 sucks up water 43 from base 40 to add structural rigidity to folded side wall 16. Folded side wall 16 expands outwardly until it is restrained by shallow retaining wall 46, as shown in FIG. 11. It will be appreciated that water 43 substantially fills outer chamber 30 uniformly due to apertures 36 in supports posts 34. Any space left in the upper portion of outer chamber 30 above the liquid level is under vacuum. The vacuum behaves substantially the same as the water, and also serves as an insulator having even better insulation properties than the water in chamber 30.

Figure 12:
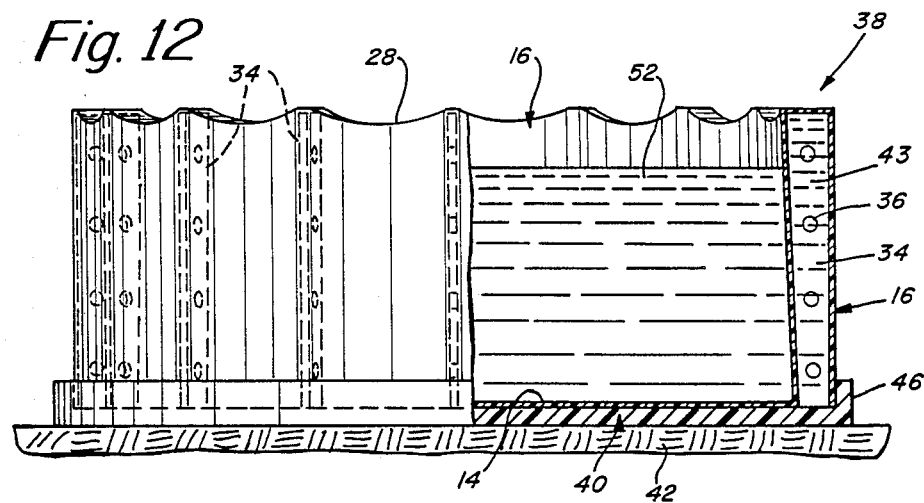
FIG. 12 is a part side elevational view, partially broken away of a swimming pool formed according to the present invention.
Figure 13:
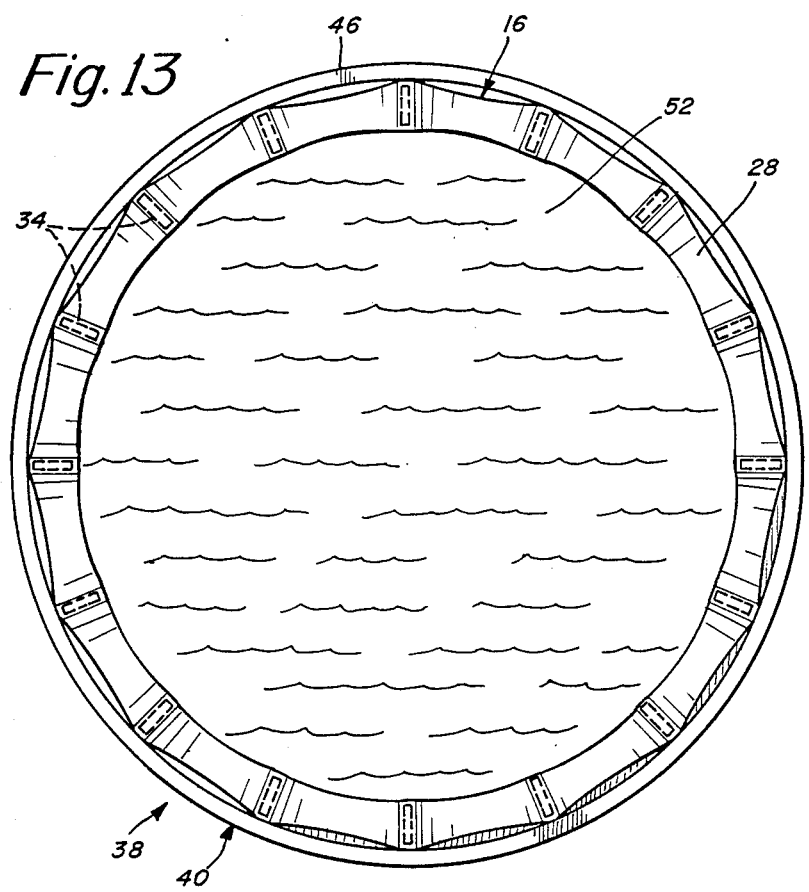
FIG. 13 is a top plan view of the swimming pool of FIG. 12.

In such case, structural rigidity is imparted to folded side wall 16 by means of support posts 34 and water 43 in outer chamber 30. Further, while water 52 applies an outward pressure on folded side wall 16, retaining wall 46 counteracts this pressure at the bottom of folded side wall 16 to provide still additional structural rigidity at the point of greatest pressure from water 52. Accordingly, compressed body 10 is expanded outwardly and filled with water 52 so as to form fluid container 38 which functions as a swimming pool, as shown in FIGS. 12 and 13. Because of the transparent nature of folded side wall 16, water 43 in outer chamber 30 can thereby be heated by solar energy to help maintain water 52 heated.

In the case where fluid container 38 is used as a swimming pool, it is desirable that bottom 14 should have a drain 54 by means of which swimming pool 38 can be emptied, as shown in FIG. 11. Drain 54 could include a valve or other openable sealing means (not shown). Drain 54 can be connected to a hose (not shown) which extends out of, or through, base 40.

Further, as seen best in FIG. 12, the upper edge 28 of fluid container 38 may not be straight, but rather, may dip down arcuately between adjacent support posts 34. Accordingly, a hoop-like rim or cap 55 can be placed only on upper edge 28 to provide a coplanar, circumferential upper edge 56, as shown in FIGS. 14 and 15. Rim 55 will also provide protection for the upper plastic surface 28 and support posts 34, and will add to the structural rigidity of folded side wall 16. Further, rim 55 will generally be necessary when the swimming pool is drained in order to prevent collapse of the swimming pool.

Although the present invention has been described with reference to the formation of a swimming pool, it will be appreciated that the present invention can be used for containing other fluids or other materials. For example, fluid container 38 can be used for containing a gaseous medium, such as a natural gas. In such case, bottom 14 and side wall 16 would be fluid (gas and liquid) impervious. In addition, a fluid impervious cover 58 would be secured on upper edge 28 of folded side wall 16, as shown in FIG. 16. In such case, cover 58 would include a rim 60 secured over the upper edge 28 of folded side wall in fluid sealing relation therewith, with a flexible sheet 62 of fluid impervious material secured to rim 60 and positioned over fluid container 38.

Figure 17:
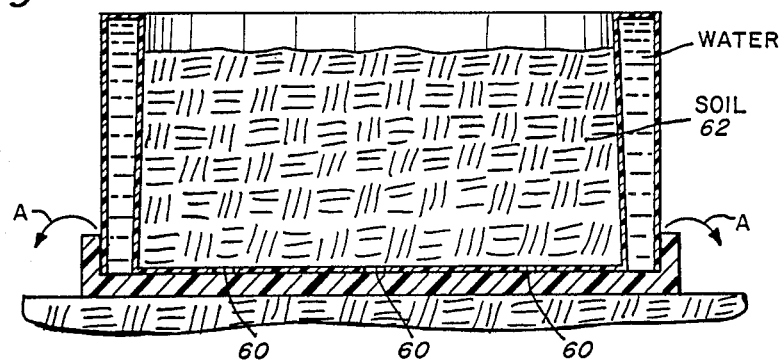
FIG. 17 is a cross-sectional view of a modified embodiment for use as a planter, and containing soil therein.

FIG. 17 illustrates an embodiment similar to that of FIG. 16, but without the cover 62, and which is modified for use in containing soil so as to serve as a planter or the like. In FIG. 17, the container is identical to that of FIG. 16, except that perforations 60 are formed in the bottom membrane of the container so as to permit drainage of water from the soil 62 contained in the container.

Assembly of the apparatus of FIG. 17 is the same as that of FIG. 16, except that soil 62 is filled inside of the container, instead of water. While using the device of FIG. 17 as a planter or the like, drainage is provided through the perforations 60, and out through the edges of the device in the direction of arrows A as indicated in FIG. 17. Of course, materials other than soil could be filled in the container.

Figure 18:
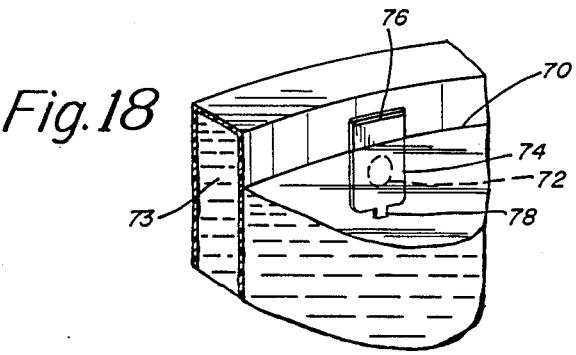
FIG. 18 illustrates skimming valves for use in the present invention.

FIG. 18 illustrates a valve arrangement provided at the upper portion of the inner side wall of the container which can be used for skimming the upper surface of the liquid contained within the container. In FIG. 18, the liquid level line is indicated with the reference numeral 70. The container has perforations 72 spaced around the upper portion thereof, the perforations being covered valve flaps 74, which are adhered, for example, to the inner wall of the container by means of heat sealing or the like (shown by reference numeral 76). In order to skim the upper layer of liquid out of the container, a user may open valve flap 74 by pulling outwardly on the tab 78 to expose the opening 72. In such a case, liquid from inside the container will pass through opening 72, into the interior 73 of the container wall, and out through the bottom portion of the container wall. Care must be taken not to permit the liquid level 70 to fall below the opening 72, in order to prevent air from entering into the interior space 73 of the side walls. A plurality of the valves 72, 74 may be provided around the upper periphery of the container as desired. Other valve structures could be used.

Figure 19:
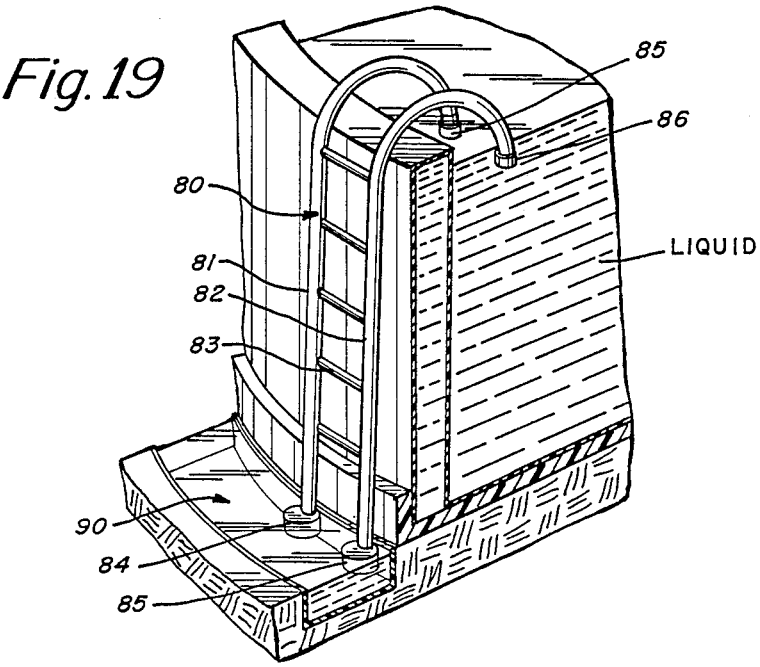
FIG. 19 illustrates the use of a ladder made of tubular members used for recirculating liquid in the container.

FIG. 19 shows a partial broken-away perspective view of another arrangement of the present invention including a ladder 80 formed of hollow pipe-like vertical members 81, 82 which can be used to transport liquid into and out of the interior of the container. This is particularly advantageous when the container is used as a swimming pool Cross members 83 extend between members 81, 82 and serve as steps. The ladder with the hollow tubular members 81, 82 ca be used to recirculate the liquid within the pool by providing one or two pumps 84, 85 connected to the respective hollow members 81, 82 to, for example, respectively draw liquid out of the pool, and to pump liquid back into the pool. The liquid could be passed through a filter provided separately from the pumps or contained within the pumps, and the filtered liquid could then be pumped back into the pool in a recirculating manner. The pumps 84, 85 may be conventional pumps for such use, and are shown only schematically in FIG. 19.

The hollow tubular members 81, 82 of FIG. 19 are preferably provided with valves 85, 86 at the open ends thereof which project below the upper level of the liquid in the container. The valves 55, 86 may be one-way valves, or may be manually operable when it is decided to recirculate water in the container. Filters may also be provided in combination with the valves 85, 86, as desired.

As also shown in FIG. 19, a surface-level storage pool 90 may be provided to contain water (or other fluid used in the container) to serve as a solar heating pond, and from which the recirculated water can be drawn, thereby heating the water that is being pumped back into the container. This is a particularly efficient configuration. The solar heating pool 90 can be any shape, as desired, and may preferably be provided around a portion of the periphery of the container. When the container is round, as is preferable, the solar heating pool 90 can be arcuate.

Figure 20:
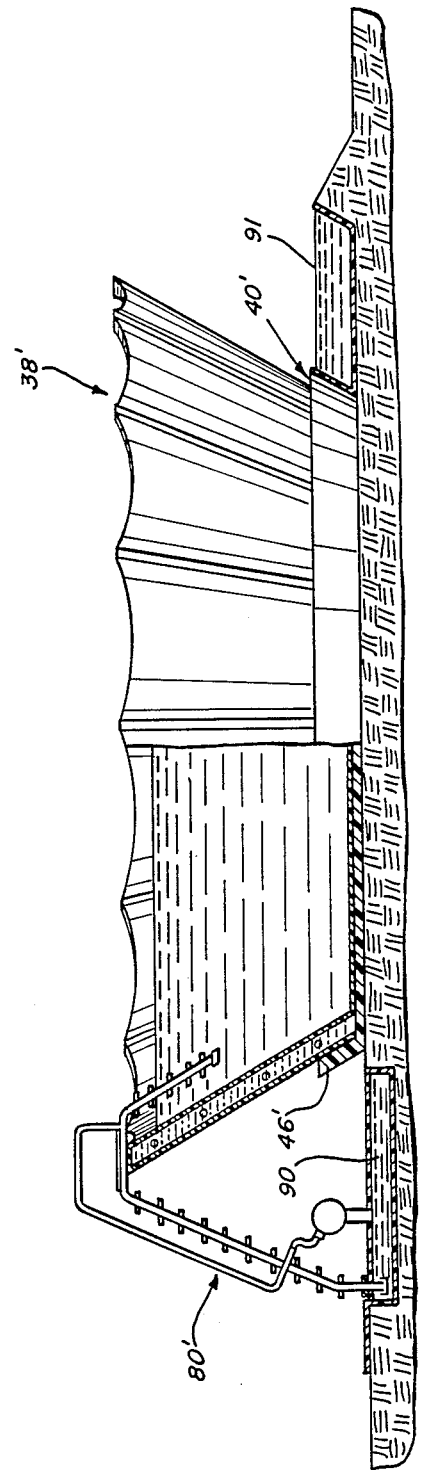
FIG. 20 is a side view partially broken away of a fluid container of the present invention having inclined side walls.

FIG. 20 shows another embodiment of the invention having outwardly inclined side walls and a solar heating pool around a portion of the periphery thereof. In all other respects, the basic construction of the container is substantially the same as the previously described embodiments and primed reference numerals are used to designate corresponding components. The container of FIG. 20, in some instances, may be used for improved appearance, especially when used as a swimming pool. A ladder 80' is schematically shown in FIG. 2 for recirculating fluid.

An advantage of the arrangement of the present invention using a ladder, is that the pool can be used at ground level, and can project upwardly therefrom. The pool can be made of transparent or translucent materials so that it has a very good appearance from ground level. Use of the ladder with the recirculating liquid mechanism also eliminates the necessity of erecting a raised deck or platform around the pool, thereby enabling easy access and recirculation of liquid, reducing costs and still giving a good appearance. The surface portion 91 of solar heating pool 90 is exposed.

It will be appreciated that various changes can be made to the invention within the scope of the claims. For example, although flexible membrane 12 has been shown in a cylindrical configuration, any other suitable shape, such as an oval or polygonal configuration, or outwardly inclined arrangements, can be used instead. Specifically, in the embodiment of FIGS. 1–5, flexible membrane 12 can be formed in an oval or octagonal cup-shaped configuration.

Having described specific preferred embodiments of the invention with reference to the accompanying drawings, it will be appreciated that the present invention is not limited to those precise embodiments, and that various changes and modifications may be effected therein by one of ordinary skill in the art without departing from the scope or spirit of the invention as defined in the appended claims.

What is claimed is:

1. A compressed body that is usable as a fluid container when expanded, said compressed body comprising:
   an open cup-shaped flexible membrane having a bottom and a side wall connected to said bottom;
   an upper portion of the side wall of the cup-shaped flexible membrane folded externally over a lower portion of the side wall;
   an outer chamber defined between the upper and lower portions of said side wall, said outer chamber being open adjacent the bottom of said cup-shaped flexible membrane;
   a plurality of substantially rigid supports inserted in said outer chamber; and
   said folded side wall being compressed toward a center of said cup-shaped flexible membrane.

2. A compressed body according to claim 1, wherein said bottom has a circular configuration and said side wall has a cylindrical configuration.

3. A compressed body according to claim 1, wherein said flexible membrane is liquid impervious.

4. A compressed body according to claim 3, wherein said flexible membrane is gas impervious.

5. A compressed body according to claim 1, wherein at least said side wall of said flexible membrane is at least translucent to permit solar heating of a liquid in said outer chamber when said compressed body is expanded into said fluid container.

6. A compressed body according to claim 5, wherein at least said side wall of said flexible membrane is transparent to permit solar heating of a liquid in said outer chamber when said compressed body is expanded into said fluid container.

7. A compressed body according to claim 1, wherein at least one said rigid support has at least one aperture therein to permit passage of a liquid therethrough.

8. A compressed body according to claim 7, wherein each said rigid support has a plurality of apertures therein to permit passage of a liquid therethrough.

9. A compressed body according to claim 1, wherein said compressed body has the form of a cylindrical spur gear.

10. A method of constructing a compressed body that is usable as a fluid container when expanded, said method comprising the steps of:
    forming a flexible membrane into a cup shape with a bottom, a side wall connected to said bottom and said side wall being open at an upper portion thereof;
    folding the upper portion of the side wall of the cup-shaped flexible membrane externally over a lower portion of the side wall so as to define an outer chamber between the upper and lower portions of said side wall, said outer chamber being open adjacent the bottom of said cup-shaped flexible membrane;
    inserting a plurality of substantially rigid supports in said outer chamber; and
    compressing said folded side wall toward a center of said cup-shaped flexible membrane to form said compressed body.

11. A method according to claim 10, further including the step of forming said flexible membrane as a liquid impervious membrane.

12. A method according to claim 11, further including the step of forming said flexible membrane as a gas impervious membrane.

13. A method according to claim 10, further including the step of forming at least said side wall of said flexible membrane to be at least translucent to permit solar heating of a liquid in said outer chamber when said compressed body is expanded into said fluid container.

14. A method according to claim 13, further including the step of forming at least said side wall of said flexible membrane to be transparent to permit solar heating of a liquid in said outer chamber when said compressed body is expanded into said fluid container.

15. A method according to claim 10, further including the step of forming at least one aperture in least one said rigid support to permit passage of a liquid therethrough.

16. A method according to claim 15, further including the step of forming a plurality of apertures in each said rigid support to permit passage of a liquid therethrough.

17. A fluid container comprising:
    a base having a bottom wall and a shallow retaining wall extending around the periphery of said bottom wall and in liquid sealing contact therewith; and
    an open cup-shaped flexible membrane positioned on said bottom wall and within said shallow retaining wall, said flexible membrane including:
    a bottom,
    a side wall connected to said bottom,
    an upper portion of the side wall folded externally over a lower portion of the side wall, an outer chamber defined between the upper and lower portions of said side wall, said outer chamber being open adjacent the bottom of said cup-shaped flexible membrane, a plurality of substantially rigid supports inserted in said outer chamber, said folded side wall of said flexible membrane being expanded outwardly by a fluid supplied thereto so that said folded side wall is restrained by said shallow retaining wall of said base and so that a liquid on said base at least substantially fills said outer chamber to provide additional rigidity to said expanded side wall.

18. A fluid container according to claim 17, wherein said flexible membrane is liquid impervious.

19. A fluid container according to claim 18, wherein said flexible membrane is gas impervious.

20. A fluid container according to claim 17, wherein at least said side wall of said flexible membrane is at least translucent to permit solar heating of said liquid in said outer chamber.

21. A fluid container according to claim 20, wherein at least said side wall of said flexible membrane is transparent to permit solar heating of said liquid in said outer chamber.

22. A fluid container according to claim 17, wherein at least one said rigid support has at least one aperture therein to permit passage of a liquid therethrough.

23. A fluid container according to claim 22, wherein each said rigid support has a plurality of apertures therein to permit passage of a liquid therethrough.

24. A fluid container according to claim 17, wherein said expanded and folded side wall has an upper edge; and further including upper rim means for covering said upper edge.

25. A fluid container according to claim 19, wherein said expanded and folded side wall has an upper edge that defines an upper opening; and further including cover means for covering said opening.

26. A fluid container according to claim 25, wherein said cover means includes a rim secured to said upper edge and a cover sheet secured to said rim in covering relation to said opening.

27. A method of constructing a fluid container from a compressed body of the type formed from an open cup-shaped flexible membrane having a bottom and a side wall connected to said bottom; an upper portion of the side wall of the cup-shaped flexible membrane folded externally over a lower portion of the side wall to define an outer chamber between the upper and lower portions of said side wall, said outer chamber being open adjacent the bottom of said cup-shaped flexible membrane; a plurality of substantially rigid supports inserted in said outer chamber; and said folded side wall being compressed toward a center of said cup-shaped flexible membrane, said method comprising the steps of:

positioning a base having a bottom wall and a shallow retaining wall extending around the periphery of said bottom wall and in liquid sealing contact therewith, on a surface;

supplying a liquid to said base;

positioning said compressed body on said base within said shallow retaining wall such that said outer chamber opens into said liquid; and filling said cup-shaped flexible membrane with a material to cause said folded side wall of said flexible membrane to be expanded outwardly until restrained by said shallow retaining wall of said base and to cause said liquid to at least substantially fill said outer chamber to provide additional rigidity to said expanded side wall.

28. A method according to claim 27, wherein said material used to fill said cup-shaped flexible membrane is a fluid.

29. A method according to claim 27, further including the step of securing a rim on an upper edge of said expanded and folded side wall.

30. A method according to claim 27, further including the step of applying a cover over an upper open end of said fluid container.

* * * * *